United States Patent
Yang et al.

(10) Patent No.: US 8,185,102 B2
(45) Date of Patent: May 22, 2012

(54) REDUCING CO-INTERFERENCE ON A MULTI-RADIO PLATFORM

(75) Inventors: Xue Yang, Portland, OR (US); Lakshman Krishnamurthy, Portland, OR (US); Xingang Guo, Portland, OR (US); Jing Z. Zhu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 11/845,137

(22) Filed: Aug. 27, 2007

(65) Prior Publication Data

US 2009/0061849 A1    Mar. 5, 2009

(51) Int. Cl.
*H04W 4/00*    (2009.01)
*H04W 40/00*   (2009.01)
*H04B 7/00*    (2006.01)

(52) U.S. Cl. .............. 455/426.1; 455/445; 370/310

(58) Field of Classification Search .......... 455/426.1
See application file for complete search history.

(56) References Cited

U.S. PATENT DOCUMENTS

| | | |
|---|---|---|
| 2005/0226178 A1 | 10/2005 | Forand et al. |
| 2006/0087984 A1* | 4/2006 | Kim et al. ............... 370/252 |
| 2007/0066314 A1* | 3/2007 | Sherman et al. ......... 455/445 |
| 2007/0076649 A1 | 4/2007 | Lin et al. |
| 2007/0097903 A1* | 5/2007 | Roy et al. ............... 370/328 |
| 2008/0062919 A1 | 3/2008 | Chen et al. |
| 2010/0081447 A1 | 4/2010 | Qi et al. |

* cited by examiner

*Primary Examiner* — Lester Kincaid
*Assistant Examiner* — Andy Gu
(74) *Attorney, Agent, or Firm* — Schwabe, Williamson & Wyatt, P.C.

(57) ABSTRACT

A wireless communications device in a first network with contention-based access may send a special frame to one or more other devices in the first network, informing them that it will not be available to receive any transmissions during a specified time period. The frame may also specify a delay period, indicating when the period of unavailability will start. When the device sending the special frame also has a co-located radio that operates in a second network that uses centrally-controlled scheduling, this special frame may be used to prevent other devices in the first network from sending it any transmissions while the co-located radio is communicating in the second network, thereby reducing the chance of interference between the two co-located radios.

7 Claims, 4 Drawing Sheets

| START TIME | ABSENCE DURATION |
|---|---|

FIG. 3A

| START TIME | ABSENCE DURATION | PERIOD | NUMBER OF ABSENCES |
|---|---|---|---|

FIG. 3B

| START TIME #1 | ABSENCE DURATION #1 | START TIME #2 | ABSENCE DURATION #2 | ... | START TIME #n | ABSENCE DURATION #n |
|---|---|---|---|---|---|---|

FIG. 3C

REDUCING CO-INTERFERENCE ON A MULTI-RADIO PLATFORM

BACKGROUND

Some wireless communications devices are able to operate concurrently in multiple different types of networks (e.g., WiFi, WiMAX, Bluetooth, etc.), by including multiple radios within the device (a multi-radio platform, or MRP). However, when one radio is transmitting (e.g., to a WiMAX base station) while another radio on the platform is trying to receive (e.g., from a WiFi access point), the receiving radio may be overwhelmed by the strong signals from the co-located transmitting radio, and thus the received data will be lost and must be communicated again. A similar problem occurs when the two radios share resources (e.g., an antenna or a front-end circuit), and thus cannot operate at the same time. The problem may be very pronounced when at least one of the radios is operating in a network that uses a central node to schedule communications (e.g., WiMAX), but the other operates in a network that uses contention-based access (e.g., WiFi). Other devices in the WiFi network may not be aware of the WiMAX radio in the MRP, and may transmit to the MRP at the same time the WiMAX radio in the MRP is transmitting. These WiFi transmissions will almost certainly be lost at the MRP and will need to be re-sent, possibly multiple times if the WiMAX transmission is longer than the retransmission interval. Thus the WiMAX radio on a single MRP device can negatively impact overall network throughput of the WiFi network.

BRIEF DESCRIPTION OF THE DRAWINGS

Some embodiments of the invention may be understood by referring to the following description and accompanying drawings that are used to illustrate embodiments of the invention. In the drawings:

FIGS. 3A, 3B, and 3C show various formats that may be used in a Notice of Absence, according to various embodiment of the invention.

DETAILED DESCRIPTION

Figure 1:
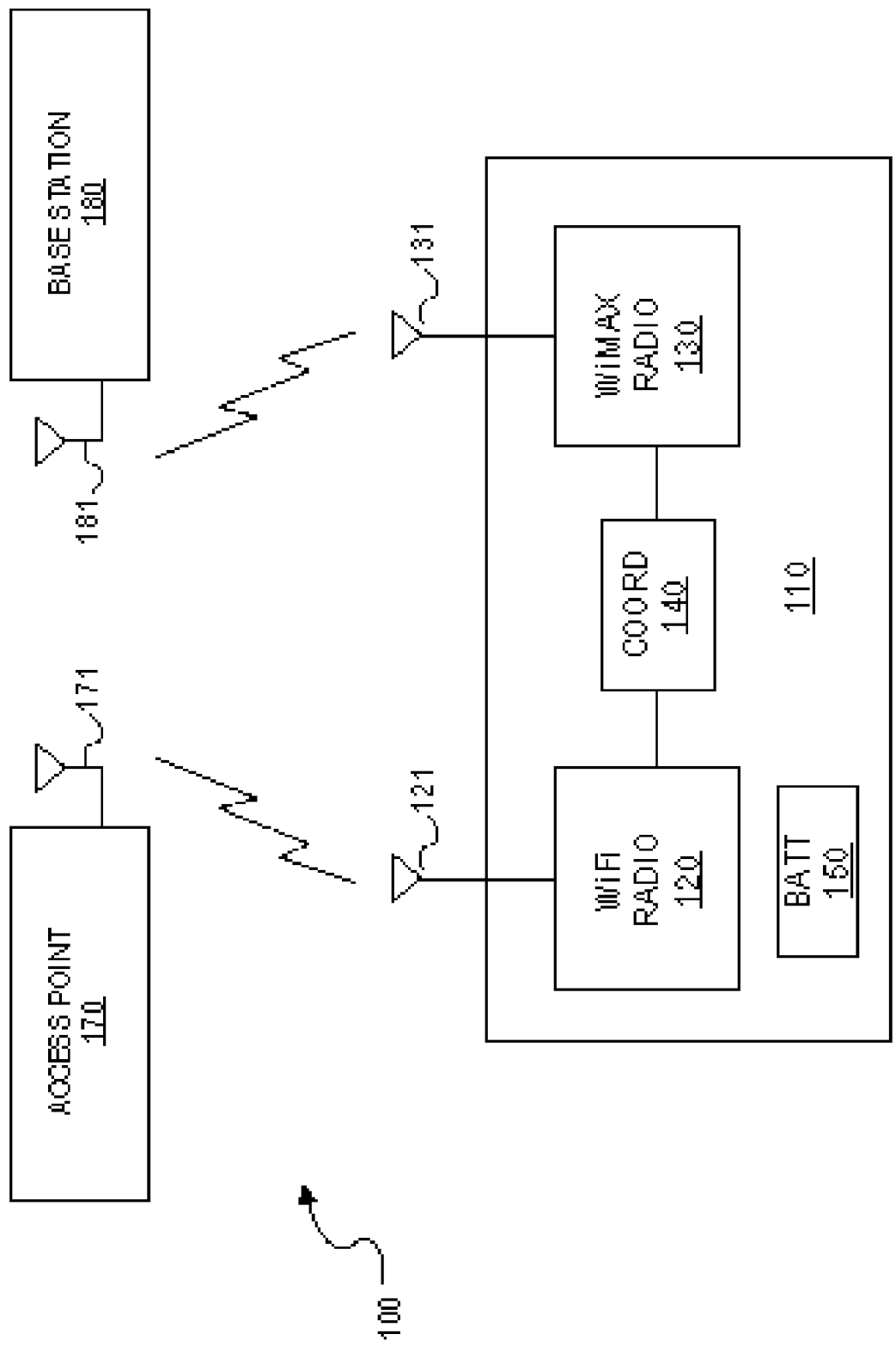
FIG. 1 shows a wireless device with two radios, each radio for communicating in a different type of network.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

Various embodiments of the invention may use a specific type of control frame (referred to here as a Notification of Absence frame, or NOA) to notify at least one other device in a wireless network that the device transmitting the NOA will be unavailable for receiving during a specified period of time. This specified period of time may coincide with the period during which a co-located radio is scheduled to transmit. The control frame may also indicate a time at which the period of absence starts. Although other techniques may be used to prevent other devices from transmitting to a particular device for a period of time, they may have negative side affects. For example, sending out a Power Save frame causes other devices to immediately cease transmitting to the device that sent the Power Save frame, making it unavailable too soon. Similarly, sending out a CTS-to-self frame, or a Quiet period frame, may cause most of the network to go silent, thus greatly reducing network throughput. By contrast the NOA frame only stops transmissions to the single device, for a period of time that can be delayed to coincide with subsequent transmissions from a co-located radio operating in another network. This in turn may prevent transmissions from the co-located radio from interfering with receptions by the radio that send out the NOA, simply by delaying those receptions until the co-located radio is no longer transmitting.

FIG. 1 shows a wireless device with two radios, each radio for communicating in a different type of network. In the illustrated embodiment, wireless device 110 may communicate with access point 170 in one type of network, and also communicate with base station 180 in another type of network. Although the terms 'access point' and 'base station' are used here to designate the centralized nodes in the two different networks, these labels are primarily for convenience of description, and various embodiments may encompass other nodes that are described with other labels. Within the context of this document, the term 'radio' encompasses the radio frequency (RF) circuitry to modulate signals into the proper format for RF transmission and amplify those signals to the proper power level, RF circuitry to demodulate received signals, circuitry to convert digital signals to analog and analog signals to digital, and circuitry to create and/or decipher the content of the digital signals to the extent needed to permit proper communications in the relevant network, including scheduling tasks. In some embodiments each radio may contain one or more digital processors, such as a digital signal processor (DSP) and/or a general purpose processor.

Wireless communications device 110 includes a first radio 120 for communicating wirelessly with access point (AP) 170 through antennas 121 and 171, respectively, and a second radio 130 for communicating wirelessly with base station 180 through antennas 131 and 181, respectively. A coordinator 140 acts to notify radio 120 in advance of a scheduled transmission by radio 130, and of the timing of that scheduled transmission. In some embodiments, wireless device 110 may be a mobile device that can communicate while moving, and/or may use a battery 150 to provide operating power. The two radios are labeled as a WiFi radio and a WiMAX radio, and these terms will be used frequently in this document. But various embodiments of the invention may extend to other types of radios, in particular to a radio operating in a network with contention-based access (e.g., the WiFi radio) and a radio operating in a network with scheduled access (e.g., the WiMAX radio). Within the context of this document, a network with scheduled access is a network in which a device that wishes to transmit must wait until a pre-scheduled time that has been allocated to that specific device, while a network with contention-based access is a network in which a device that wishes to transmit may try to transmit opportunistically during times when the medium appears to be unused by others. Within the context of this document, a WiFi radio shall be a radio that conforms to the requirements of the Institute of Electrical and Electronic Engineers (IEEE) standard 802.11 published in 2007, and the WiMAX radio shall be a radio that conforms to the requirements of IEEE standard 802.16 published in 2007.

In the illustrated example, if only the AP 170 communicates directly with the WiFi radio 120, then in some embodiments the NOA frame may be sent only to the AP 170. However, if other devices (not shown) in the WiFi network can communicate directly with WiFi radio 120, then the NOA frame may be sent to those devices.

Figure 2:
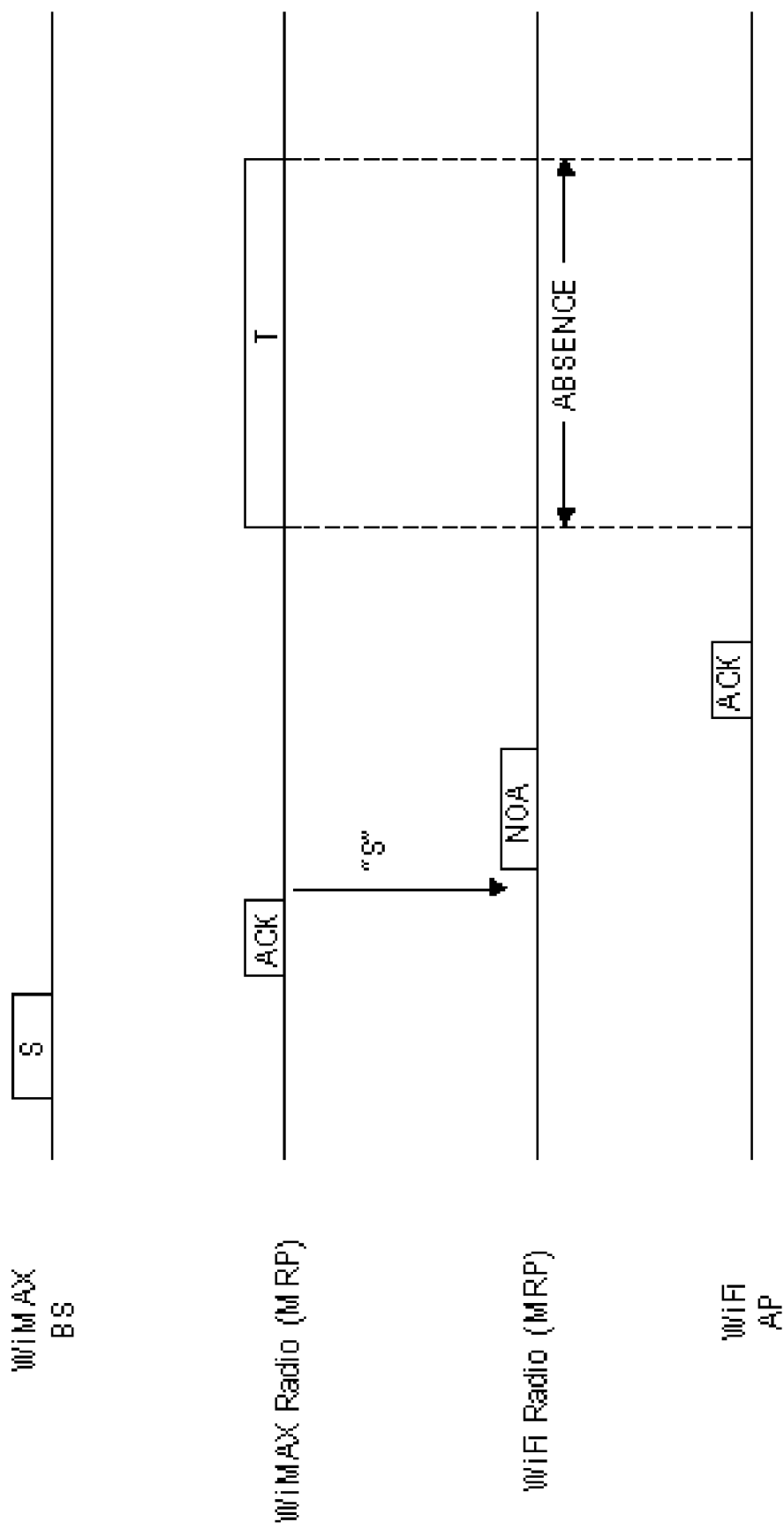
FIG. 2 shows a timing diagram of communications between a WiMAX base station and its associated WiMAX radio in an MRP, and between a WiFi access point and its associated WiFi radio in the MRP, according to an embodiment of the invention.

FIG. 2 shows a timing diagram of communications between a WiMAX base station and its associated WiMAX radio in an MRP, and between a WiFi access point and its associated WiFi radio in the MRP, according to an embodiment of the invention. In the illustrated example, the WiMAX base station may transmit a schedule S to the WiMAX radio, with the schedule indicating one or more periods of time during which the WiMAX radio may be communicating with the base station. This schedule may be transmitted in any feasible form. For example, the base station may announce its scheduling in a map in a downlink communication, indicating when various WiMAX radios, including the one shown here, are permitted to communicate with the base station. The WiMAX radio may respond by transmitting an acknowledgement (ACK) to the base station to indicate, among other things, that the schedule was received. The WiMAX radio in the MRP may then deliver this schedule to the WiFi radio in the MRP, as shown by the arrow "S". Since the WiFi and WiMAX radios are co-located, this delivery may take place over hardwired internal connections (e.g., through coordinator 140 in FIG. 1) rather than being transmitted wirelessly.

Once the WiFi radio knows the schedule of one or more impending communication operations by the WiMAX radio, the WiFi radio may send out a Notice of Absence (NOA) communication to its associated access point AP. The AP may acknowledge reception of the NOA with an ACK, according to the conventions of the communication protocol being used. The AP may then refrain from transmitting to the WiFi radio during the indicated period of absence. The period of absence specified in the NOA should coincide with the scheduled communication period T by the WiMAX radio. In some embodiments, T corresponds to the times during which the WiMAX radio is scheduled for transmitting. In other embodiments, where the WiMAX and WiFi radio share an antenna, front end, or other communication circuitry that is used in receive operations, T may correspond to both transmit and receive scheduled times of the WiMAX radio. Although the AP should not transmit to this WiFi radio during the indicated period of absence, the AP can use this time effectively by transmitting to other WiFi radios in the network during that time.

FIGS. 3A, 3B, and 3C show various formats that may be used in a Notice of Absence, according to various embodiment of the invention. In the illustrated examples, the indicated elements may be part of an action frame. The frame may also contain various other elements, such as but not limited to: 1) a frame control field to define what type of frame is being sent, 2) addresses to specify such things as the destination device, originating device, transmitting device, and receiving device for this particular frame, 3) the length of this particular frame, 4) a check field to verify the integrity of the received frame, 5) etc. The indicated elements in FIGS. 3A-3C may be imbedded in any suitable frame, so the other elements of the frame are not shown so as to avoid confusion. In some embodiments, each field shown in FIGS. 3A-3C is an information element (IE).

The IE's of FIG. 3A may represent a NOA for a single period of absence. The Start Time may indicate when the period of absence is to start, while the Absence Duration may indicate how long the period of absence is to last. Since the WiFi radio may not be able to immediately obtain the channel when it is ready to transmit the NOA, it should begin trying to transmit the NOA well before the period of absence is to begin. The Start Time IE permits this to be done, without unnecessarily starting the period of absence prematurely.

The IE's of FIG. 3B may represent a series of NOA's having the same duration and spaced apart by the same amount of time. The Start Time may indicate when the first period of absence is to start, while the Absence Duration may indicate how long the first (and each of the subsequent) periods of absence is to last. The Period field may indicate how often these periods of absence are to take place. For example, the Period field may indicate the amount of time that elapses between the start of one period of absence and the start of the next period of absence. The Number of Absences field may indicate now many periods of absence are being specified in this NOA.

The IE's of FIG. 3C may represent a series of NOA's that may have different durations and/or be spaced apart by different amounts of time. For each period of absence specified in this NOA, there is a Start Time field and an associated Absence Duration field, to indicate when the specified period of absence is to start and how long it is to last. In some embodiments, the number of periods of absence that may be specified in this manner may be limited only by the number of IE's that are permitted in the frame.

The format of FIG. 3A has the advantage of being short, with a predefined number of IE's, but has the disadvantage of being able to specify only a single period of absence. The format of FIG. 3B has the advantages of having a predefined number of IE's and of being able to specify multiple periods of absence, but has the disadvantage of only being able to be used when those multiple periods of absence have the same spacing and duration. The format of FIG. 3C has the advantage of being able to specify multiple periods of absence with non-uniform spacing and/or duration, but has the disadvantage of requiring a variable number of IE's, so the number of IE's devoted to this purpose must be specified somewhere in the frame.

Figure 4:
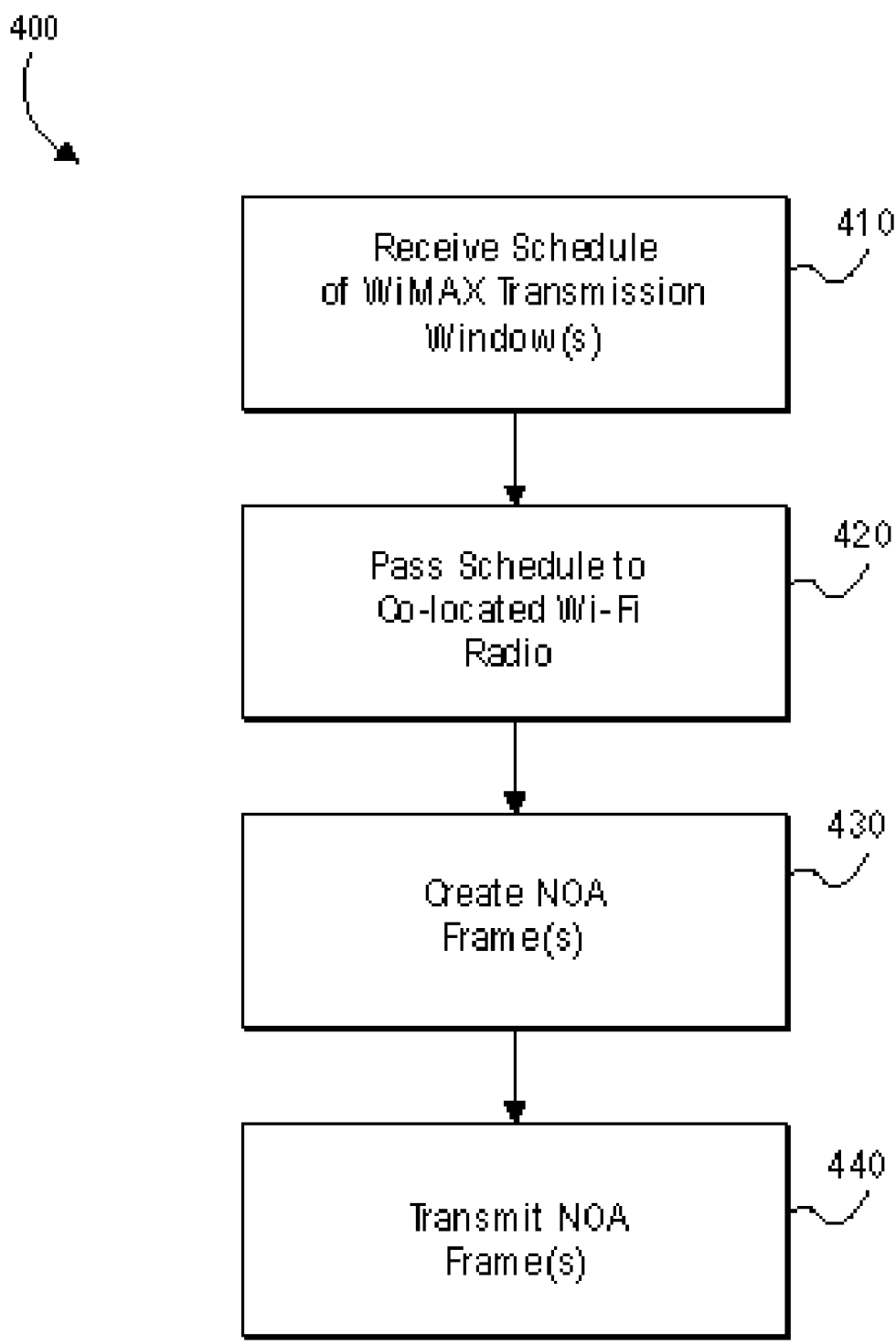
FIG. 4 shows a flow diagram of a method of using a Notice of Absence, according to an embodiment of the invention.

FIG. 4 shows a flow diagram of a method of using a Notice of Absence, according to an embodiment of the invention. In the illustrated flow diagram 400, at 410 a WiMAX radio in an MRP may receive a schedule of one or more time periods when the WiMAX radio may communicate with the base station. At 420, the WiMAX radio may pass the schedule information on to a co-located WiFi radio through a coordinator that handles scheduling communication between the two radios. The WiFi radio may then create one or more NOA frames at 430, using a format suitable for such frames. At 440 the one or more NOA frames may be transmitted to one or more devices that have the capability and authorization to transmit to this WiFi radio, so that those devices will know not to transmit to this WiFi radio during the periods of absence specified in the NOA frame(s).

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus comprising:
   a first radio in a wireless communications device to communicate in a first network using contention-based access;
   and a second radio in the wireless communications device to communicate in a second network using scheduled access;
   wherein the second radio is configured to receive a wireless communication in the second network, the wireless communication including scheduled communications time information for the second radio;
   wherein the second radio is coupled to the first radio to pass the scheduled communications time information to the first radio;
   wherein the first radio is configured to wirelessly transmit a frame indicating at least one period in which the first radio is to receive no transmissions in the first network, the at least one period based on the scheduled communications time information;
   wherein the frame is a Notification of Absence (NOA) frame and is not a Power Save frame, a Clear to Send (CTS) frame, or a Quiet Period frame; and
   wherein the NOA frame indicates multiple periods of time in which the first radio is to receive no transmissions in the first network, the NOA frame further comprising:
   a Start Time field to indicate the start time, the start time indicating when a first period of time of the multiple periods of time is to start;
   an Absence Duration field to indicate the duration for the first period of time and each subsequent period of time of the multiple periods of time is to last, the duration being the same for each period of time of the multiple periods of time;
   a Period field to indicate an amount of time that elapses between the start of the first period of time of the multiple periods of time and a start of a subsequent second period of time of the multiple periods of time, the amount of time that elapses being the same between the start of each period of time of the multiple periods of time;
   and a Number of Absences field to indicate a number of periods of time specified for the frame.

2. The apparatus of claim 1, wherein the first network comprises a WiFi network.

3. The apparatus of claim 1, wherein the second network comprises a WiMAX network.

4. The apparatus of claim 1, further comprising a battery coupled to the first and second radios to provide operational power to the first and second radios.

5. The apparatus of claim 1, wherein the scheduled communication time includes scheduled transmission time for the second radio but does not include scheduled receive time for the second radio.

6. A method, comprising:
   receiving, by a first radio over a wireless network with scheduled access to a first wireless communications medium, information indicating at least one period of time during which the first radio may transmit;
   passing the information to a second radio contained in a multi-radio platform with the first radio; and
   transmitting, by the second radio over a wireless network with contention-based access to a second wireless communications medium, a notice that the second radio is not to receive any communications over the second wireless communication medium during the at least one period of time during which the first radio may transmit;
   wherein the notice is transmitted in a Notification of Absence (NOA) frame and is not transmitted in a Power Save frame, a Clear to Send (CTS) frame, or a Quiet Period frame: and
   wherein the NOA frame indicates multiple periods of time in which the first radio is to receive no transmissions in the first network, the NOA frame further comprising:
   a Start Time field to indicate the start time, the start time indicating when a first period of time of the multiple periods of time is to start;
   an Absence Duration field to indicate the duration for the first period of time and each subsequent period of time of the multiple periods of time is to last, the duration being the same for each period of time of the multiple periods of time;
   a Period field to indicate an amount of time that elapses between the start of the first period of time of the multiple periods of time and a start of a subsequent second period of time of the multiple periods of time, the amount of time that elapses being the same between the start of each period of time of the multiple periods of time; and a Number of Absences field to indicate a number of periods of time specified for the frame.

7. An article comprising a tangible machine-readable medium that contains instructions, which when executed by one or more processors result in performing operations comprising:
  receiving, by a first radio over a wireless network with scheduled access to a first wireless communications medium, information indicating at least one period of time during which the first radio may transmit;
  passing the information to a second radio contained in a multi-radio platform with the first radio; and
  transmitting, by the second radio over a wireless network with contention-based access to a second wireless communications medium, a notice that the second radio is not to receive any communications over the second wireless communication medium during the at least one period of time during which the first radio may transmit;
  wherein the notice is transmitted in a Notification of Absence (NOA) frame and is not transmitted in a Power Save frame, a Clear to Send (CTS) frame, or a Quiet Period frame; and
  wherein the NOA frame indicates multiple periods of time in which the first radio is to receive no transmissions in the first network, the NOA frame further comprising:
    a Start Time field to indicate the start time, the start time indicating when a first period of time of the multiple periods of time is to start;
    an Absence Duration field to indicate the duration for the first period of time and each subsequent period of time of the multiple periods of time is to last, the duration being the same for each period of time of the multiple periods of time;
    a Period field to indicate an amount of time that elapses between the start of the first period of time of the multiple periods of time and a start of a subsequent second period of time of the multiple periods of time, the amount of time that elapses being the same between the start of each period of time of the multiple periods of time; and
    a Number of Absences field to indicate a number of periods of time specified for the frame.

* * * * *